(12) United States Patent
Calvas et al.

(10) Patent No.: US 7,448,914 B2
(45) Date of Patent: Nov. 11, 2008

(54) ADAPTER FOR ELECTRICALLY CONNECTING A MINIATURE INTEGRATED CIRCUIT CARD IN A MEMORY CARD CONNECTOR

(75) Inventors: Bernard Calvas, Marseilles (FR); Michel Chomette, La Colle sur Loup (FR); Didier Elbaz, Marseilles (FR); Philippe Patrice, Marseilles (FR)

(73) Assignee: Gemplus, Gemenos (FR)

( * ) Notice: Subject to any disclaimer, the term of this patent is extended or adjusted under 35 U.S.C. 154(b) by 0 days.

(21) Appl. No.: 10/536,433

(22) PCT Filed: Dec. 1, 2003

(86) PCT No.: PCT/FR03/03533

§ 371 (c)(1),
(2), (4) Date: Oct. 18, 2005

(87) PCT Pub. No.: WO2004/054341

PCT Pub. Date: Jun. 24, 2004

(65) Prior Publication Data

US 2006/0133051 A1  Jun. 22, 2006

(30) Foreign Application Priority Data

Dec. 5, 2002  (FR)  ................... 02 15336

(51) Int. Cl.
*H01R 25/00* (2006.01)
(52) U.S. Cl. ........................ 439/638; 439/718
(58) Field of Classification Search ............... 439/638, 439/713, 718, 945, 521, 135, 136
See application file for complete search history.

(56) References Cited

U.S. PATENT DOCUMENTS

| | | | | |
|---|---|---|---|---|
| 4,991,060 A * | 2/1991 | Kawakami et al. | ........... | 361/778 |
| 5,117,069 A * | 5/1992 | Higgins, III | ................ | 174/261 |
| 5,823,828 A * | 10/1998 | Bricaud et al. | .............. | 439/630 |
| 6,075,706 A * | 6/2000 | Learmonth et al. | .......... | 361/737 |
| 6,305,992 B1 * | 10/2001 | Bouda et al. | ................. | 439/834 |
| 6,524,137 B1 * | 2/2003 | Liu et al. | ..................... | 439/638 |
| 6,808,424 B2 * | 10/2004 | Kaneshiro et al. | ........... | 439/638 |
| 6,984,152 B2 * | 1/2006 | Mowery et al. | ............. | 439/638 |

FOREIGN PATENT DOCUMENTS

| | | |
|---|---|---|
| EP | 1 004 979 | 5/2000 |
| EP | 1 052 590 | 11/2000 |
| WO | 99/41673 | 8/1999 |

* cited by examiner

*Primary Examiner*—Tho D. Ta
*Assistant Examiner*—Vanessa Girardi
(74) *Attorney, Agent, or Firm*—Buchanan, Ingersoll & Rooney, PC

(57) ABSTRACT

An adapter electrically connects an integrated circuit mini-card in a main electronic integrated circuit memory card connector having greater space requirement than the mini-card. The mini-card has surface contact strips and the adapter includes a main body capable of being connected to the main connector and a housing for receiving the mini-card at the surface of the main body. The housing includes inside bond pads for connection to the electric contacts of the mini-card. A mobile cover is capable of taking up a position wherein it closes at least partly the housing while maintaining the mini-card in electrically connecting position in the housing and stiffening the structure of the adapter.

24 Claims, 3 Drawing Sheets

US 7,448,914 B2

ADAPTER FOR ELECTRICALLY CONNECTING A MINIATURE INTEGRATED CIRCUIT CARD IN A MEMORY CARD CONNECTOR

This disclosure is based upon French Application No. 02/15336 filed Dec. 5, 2002, and International Application No. PCT/FR2003/003533, filed Dec. 1, 2003, the contents of which are incorporated by reference.

BACKGROUND OF THE INVENTION

The present invention concerns an adaptor for the electrical connection of an integrated-circuit mini-card in a connector.

The present invention concerns more particularly an adaptor for the electrical connection of an integrated-circuit mini-card in a main connector for an electronic integrated-circuit memory card with contact with a greater size than the mini-card, the mini-card comprising surface contact strips and the said adaptor comprising a main body able to be connected to the main connector and a housing receiving the mini-card emerging on the surface of the main body and comprising, inside, pads for connection to the electrical contacts of the mini-card.

Currently, more and more appliances are using electronic memory cards of a standard type, which allow in particular a large amount of data storage in order thus to constitute a removable data medium which overall has small dimensions and a large storage capacity. Several example embodiments of such a type of memory card are known, whose dimensions are smaller and smaller and whose storage capacities are larger and larger.

This is particularly the case with the so-called "MMC" (MultiMediaCard) sold by the company SANDISK, where the dimensions of its body containing the integrated circuits and the positioning of its conductive contact areas are defined precisely by its manufacturer and by an association of users in order to have a standard-type definition of such a card. This definition is for example the subject of the publication "MultiMediaCard System Specification Version 2.11 Official Release @ June 1999 MMC".

Another memory card with a large storage capacity, referred to as an "SD" (Secure Digital) card, is sold by SANDISK.

All the characteristics and performances of the SD cards are defined by the documents issued by the SDC (SD Card Association), whose address is 53 Muckelemi St, P.O. Box 189, San Juan Baustista, Calif. 95045-0189, USA.

The overall dimensions of the MMC and SD cards are identical, with the exception of the thickness of the SD card, which is increased.

Another memory card known as an "MS" (Memory Stick) card is sold by SONY.

All the characteristics and performances of the MS card are defined in the document published by Sony Corporation and entitled "Memory Stick Standard—Memory Stick Duo Format Specifications ver. 1.0—August 2001".

These various memory card formats all have the same rectangular shape, with longitudinal conductive areas which are arranged on or in one of the main faces parallel to and close to a transverse edge of the card.

It has been noted that the external size of each of these memory card formats is greater than the external size of a standard integrated-circuit mini-card of the mini-SIM type (SIM signifying "Subscriber Identification Module"), which is a small card currently used in the radiotelephony field as a data storage medium, in particular for data identifying the user of the mini-card.

SUMMARY OF THE INVENTION

The invention aims to propose an adaptor for connecting a mini-card in a connector designed to receive a standard memory card with high storage capacity.

To this end, the invention proposes an adaptor for the electrical connection of an integrated-circuit mini-card in a main connector for an electronic integrated-circuit memory card with contact with a size greater than the mini-card, the mini-card comprising surface contact strips and the said adaptor comprising a main body able to be connected to the main connector and a housing receiving the mini-card emerging on the surface of the main body and comprising, inside, pads for connection to the electrical contacts of the mini-card, characterised in that it comprises a movable cover which is able to occupy a position in which it at least partially closes off the housing whilst holding the mini-card in the electrical connection position in the housing and stiffening the overall structure of the adaptor.

According to other characteristics of the invention:

- the cover is mounted so as to slide longitudinally on the main body;
- the cover overall has the form of a profiled section in an inverted U comprising a transverse main plate and two longitudinal lateral wings, and each lateral wing is provided, at its free end, with a return which comes into abutment against a portion of the opposite face of the body;
- the cover comprises a transverse main plate and the cover is mounted on the body by fitting in;
- the main plate of the cover comprises means, such as embossings, for increasing its longitudinal and/or transverse rigidity;
- the cover is produced from metal;
- the top main face of the body is provided with parallel longitudinal conductive areas and the body is produced from a plastics material which is moulded around conductive blades, each blade comprising a first section electrically connected to a conductive area and a second section forming an associated connecting pad;
- the first section of each conductive blade constitutes a conductive area;
- the connecting wall of the housing, which is provided with the connecting pads, comprises, opposite contact strips on the mini-card, a cavity in which the second end section of each blade extends roughly longitudinally, forming a protrusion projecting inside the housing so that, when a mini-card is present in the housing, each connecting pad is forced elastically towards the associated contact strip in order to provide the electrical connection between them by contact;
- each connecting pad is arranged in line with a vertical connecting well which extends between the connecting wall of the housing, which is provided with the connecting pads, and a main face of the body, which contains a conductive material, so that each connecting well electrically connects a connecting pad to an associated conductive track, which is arranged on the said main face of the body, and each conductive track is electrically connected to a longitudinal conductive area associated with the connecting pad and arranged on the top main face of the body;

the conductive tracks are arranged on the bottom main face of the body, and each conductive area is arranged in line with a vertical connecting well which extends between the top main face and the bottom main face of the body, and which contains a conductive material, so that each conductive area is electrically connected to the associated conductive track through a connecting well;

the body comprises several vertically superimposed layers, and a series of conductive tracks is arranged between two layers;

each conductive pad is produced by the deposition of a film of conductive elastic material, for example silicone containing metallic particles, which forms a protrusion, protruding inside the housing, so as to guarantee the electrical connection by contact between each connecting pad and the associated contact strip on the mini-card, despite any lack of co-evenness between the connecting face of the housing and the opposite face of the mini-card;

each connecting pad is formed by a metallic dome attached to the connecting wall;

the body comprises positive location means for guaranteeing the correct positioning of the mini-card in the housing;

the mini-card is a standard card of the mini-SIM type;

the adaptor has the form of a standard card of the Multi-Media Card type;

the adaptor has the form of a standard card of the Secure Digital type;

the adaptor has the form of a standard card of the Memory Stick type.

BRIEF DESCRIPTION OF THE DRAWINGS

Other characteristics and advantages of the invention will emerge from a reading of the following detailed description, for an understanding of which reference will be made to the accompanying drawings, in which.

DETAILED DESCRIPTION

For the description of the invention, the orientations vertical, longitudinal and transverse will be adopted non-limitingly in accordance with the reference frame V, L, T indicated in the figures.

In the following description, identical, similar or analogous elements will be designated by the same reference numbers.

Figure 1:
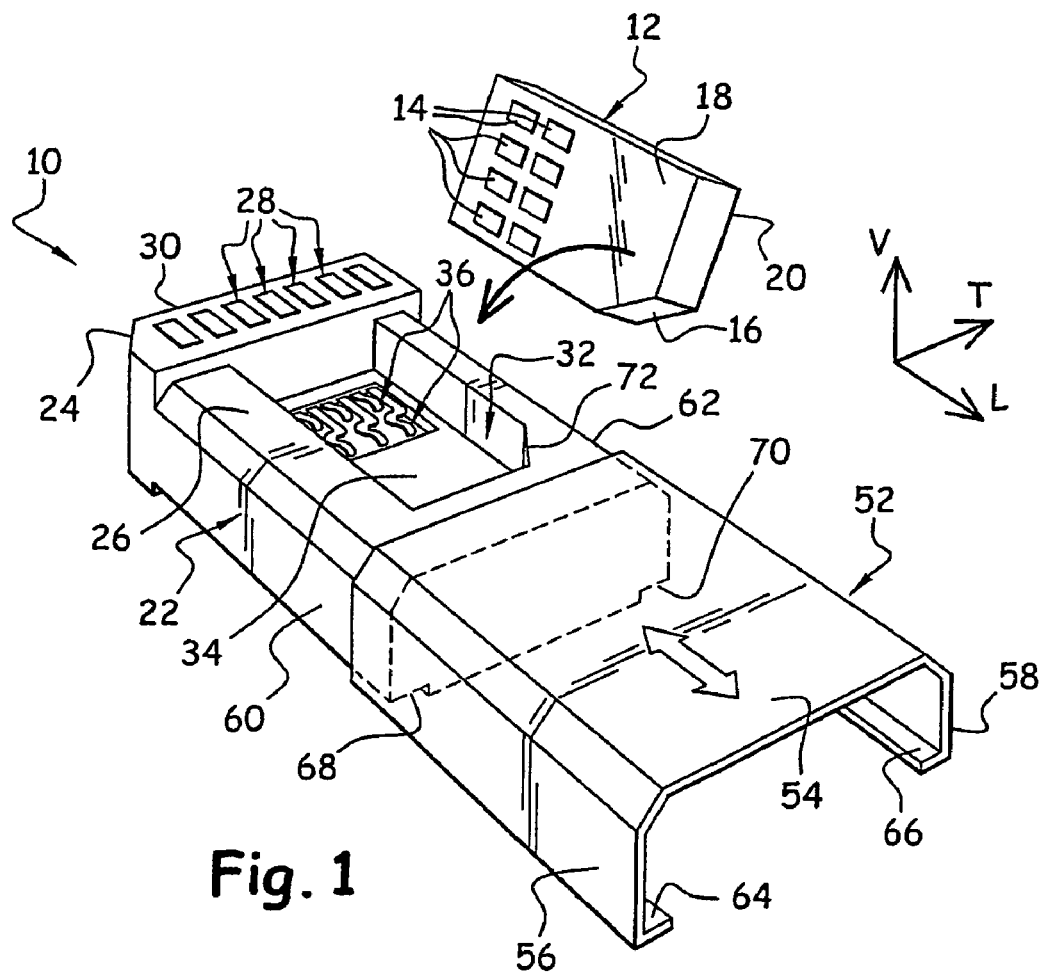
FIG. 1 is a perspective view which shows schematically a first embodiment of an adaptor according to the teachings of the invention and a mini-card before it is fitted in the adaptor.
Figure 2:
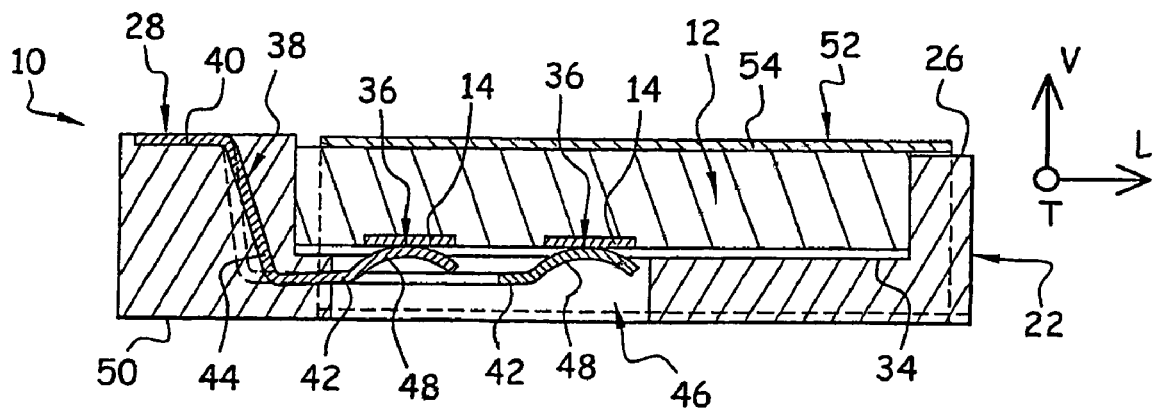
FIG. 2 is a view in longitudinal section which depicts schematically the adaptor of FIG. 1 when the mini-card is occupying its connection position inside the adaptor, the cover of the adaptor being in the closed position.

FIGS. 1 and 2 depict a first embodiment of an adaptor 10 which is produced in accordance with the teachings of the invention.

FIG. 1 therefore depicts an adaptor 10 for the electrical connection of an integrated-circuit mini-card 12 in a main connector designed to receive an electronic integrated-circuit memory card with contact, here a card of the MMC type.

The main connector, which is not shown here, is a conventional connector able to receive in a complementary manner an electronic memory card of the MMC type, so as to enable an apparatus electrically connected to the connector to process the data stored in the said card. In order to know the detailed characteristics of the electronic memory card of the MMC type, reference can be made to the document "Multi-MediaCard System Specification Version 2.11 Official Release @ June 1999 MMCA", already cited.

The standard dimensions of an MMC card are as follows: longitudinal dimension (length) of 32 mm, transverse dimension (width) of 24 mm, and vertical dimension (thickness) of 1.4 mm. The external size of the adaptor 10 must therefore comply with these dimensions.

Naturally the present invention is not limited to this memory card format but applies to any memory card format whose dimensions are compatible with the use of a mini-card.

In particular, the invention applies to an adaptor 10 in which the mini-card 12 extends partly outside the main body of the adaptor.

The mini-card 12 is here of the standard format of the mini-SIM type, which corresponds to the AFNOR standard CEN/TC 224N 405 of 10 May 1993. Such a mini-card 12 is sometimes designated by the term "plug-in" in the field of chip cards.

Naturally the present invention is not limited to mini-cards of the mini-SIM type but applies to any type of integrated-circuit data medium with a overall size less than that of the electronic memory card concerned, and having contact strips 14 for electrical connection thereof.

The mini-card 12 has a general rectangular shape which comprises a cant 16 having the function of positive location, which will be explained hereinafter.

The mini-card 12 comprises two planar main faces 18, 20, one (18) of which is provided at the contact strips 14, and comprises, in its thickness, integrated circuits or chips (not shown).

The adaptor 10 comprises a main body 22 in the form of an electronic memory card, here in the form of an MMC card.

Naturally, according to variant embodiments (not shown) of the invention, the adaptor 10 can take the form of another type of standard electronic memory card, in particular the form of a standard card of the Secure Digital type, or the form of a standard card of the Memory Stick type.

The main body 22 has here a general rectangular form which comprises a locating cant 24 corresponding to the cant provided in the MMC card format.

The body 22 is produced from an insulating material, for example a plastics material.

The top main face 26 of the body 22 is provided with parallel longitudinal conductive areas 28 which are arranged in the vicinity of a transverse edge of the body 22, or connection edge 30.

The body 22 delimits, in its thickness, a complementary housing 32 of the mini-card 12 which emerges here in the top main face 26 of the body 22 to enable the mini-card 12 to be fitted.

The housing 32 comprises a bottom wall, or connecting wall 34, which is substantially parallel to the top face 26 of the body 22 and which is provided with connecting pads 36.

The connecting pads 36 are arranged in the connecting wall 34 so that it is in contact respectively with the contact strips 14 of the mini-card 12, when the mini-card 12 occupies its electrical connection position in the housing 32, or connection position.

Each connecting pad 35 is electrically connected to an associated conductive area 28 of the adaptor 10.

According to the first embodiment depicted here, considering in particular FIG. 2, the body 22 comprises a series of conductive metallic blades 38 which each comprise a first end section 40 constituting a conductive area 28 and a second end portion 42 constituting an associated connecting pad 36.

The first end section 40 of each blade 38 extends substantially longitudinally on the top face 26 of the body 22 in the vicinity of the connecting edge 30 of the adaptor 10, and the second end section 42 extends substantially longitudinally below the connecting wall 34 of the housing 32.

Advantageously, the body 22 is moulded around the conductive blades 38.

Each blade 38 comprises, between the first 40 and second 42 end sections, an intermediate section 44 which extends here in a roughly vertical direction, and which is embedded in the plastic body 22.

Advantageously, the connecting wall 34 of the housing 32 comprises, opposite the contact strips 14 of the mini-card 12, a cavity 46 in which the second end section 42 of each blade extends roughly longitudinally, forming a protrusion 48 projecting inside the housing 32.

The cavity 46 has here the form of a rectangular window which opens out at the top in the connecting wall 34 of the housing 32 and at the bottom in the bottom main face 50 of the body 22.

Such an arrangement of the blades 38 in the cavity 46 makes it possible to exploit their elastic properties in order to ensure electrical contact between each connecting pad 36 and the associated contact strip 14 of the mini-card 12. This is because, when a mini-card 12 is fitted in the housing 32, it comes into abutment, through its contact strips 14, against the protrusions 48 of the blades 38, which causes the downward flexing of the second end section 42 of each blade 38, counter to the elastic return force which forces the second end section 42 upwards.

Advantageously, the conductive metallic blades 38 are produced from formed and cropped grilles, according to a technology similar to that used in the field of chip cards.

In accordance with the teachings of the invention a movable cover 52 is mounted on the body 22 of the adaptor 10.

The cover 52 is able to occupy a closed position on the body 22, in which it at least partially closes off the housing 32, so as to hold the mini-card 12 in the connection position, or the position of electrical connection by contact, in the housing 32, and so as to stiffen the overall structure of the adaptor 10.

The cover 52 is preferably mounted for sliding in a longitudinal direction on the body 22.

Naturally, according to variant embodiments (not shown) of the invention, the cover 52 can be mounted on the body 22 differently, for example by fitting in or "snapping in", by adhesive bonding, by hooking by means of locking elements manipulated by the user.

According to the embodiment depicted here, the cover 52 has overall the form of a profile in an inverted U comprising a transverse main plate 52 and two longitudinal lateral rings 56, 58, which are substantially parallel to the longitudinal vertical faces 60, 62 of the body 22.

Each lateral ring 56, 58 is provided, at its bottom end, with a return 64, 66 which is contained in a substantially transverse longitudinal plane and which comes into abutment against a portion of the bottom main face 50 of the body 22, so as to guide the cover 52 in longitudinal sliding with respect to the body 22.

According to the embodiment depicted here, the bottom main face 50 of the body 22 comprises two longitudinal shoulders 68, 70 substantially complementary to the returns 64, 66 on the cover 52, so as to facilitate the longitudinal guiding and the holding of the cover 52 on the body 22, and so that the external size of the adaptor 10, taking account of the cover 52, corresponds to the external size of an MMC card.

The cover 52 stiffens the structure of the adaptor 10 at the same as it holds the mini-card 12 in abutment against the connecting pads 36, that is to say in the connection position in the housing 32.

The stiffness of the cover 52 in particular compensates for the flexibility of the body 22 and of the mini-card 12, which are produced from plastics material.

The cover 52 is preferably produced from metal, which confers adequate stiffness on it.

According to a variant embodiment (not shown) the cover 52 can be produced from a non-metallic material having appropriate stiffness characteristics.

Advantageously, the cover 52 is not smooth or planar on the surface but is "profiled" so as to increase its stiffness, which confers on it improved properties of mechanical strength and abutment against the mini-card 12.

For example, the main plate 54 of the cover 52 can comprise embossings (not shown), convex towards the housing 32, which increases the stiffness of the cover 52 and therefore the stiffness of the vertical abutment of the main plate 54 against the mini-card 12, so as to keep the mini-card 12 in abutment towards the connecting wall 34 with a view to ensuring good electrical connection by contact between the connecting pads 36 and the contact strips 14.

Advantageously, the main plate 54 forms, with at least one of the lateral wings 56, 58, an angle slightly less than the angle formed by the corresponding edge of the body 22, which creates a stress line in the cover 52 which reinforces its stiffness.

The functioning of the adaptor 10 is as follows.

The mini-card 12 is first of all fitted in the housing 32, in a direction substantially perpendicular to the plane of the body 22. The mini-card 12 then occupies its connection position in the adaptor 10, each of its contact strips 14 being electrically connected to a conductive area 28 of the adaptor 10.

At the time of this fitting, the main face 18 of the mini-card 12 comprising the contact strips 14 is arranged opposite the connecting face 34.

In the embodiment depicted here, no other positioning of the mini-card 12 in the housing 32 is possible, because of the presence of the locating cant 16 on the mini-card 12, by virtue of the shape of the housing 32, which comprises a locating cant 72 complementary to that of the mini-card 12.

After the mini-card 12 is fitted, the cover 52 is moved in longitudinal sliding on the body 22 as far as a closed position in which the main plate 54 covers the opening in the housing 32, which holds the mini-card 12 in the housing 32 in vertical abutment against the connecting wall 34.

The assembly formed by the adaptor 10 and mini-card 12 in the connection position can then be inserted in a connector designed for an MMC card, which enables the connector to process the data stored in the mini-card 12.

It will be noted that a mini-card 12 generally comprises at a maximum eight contact strips 14, so that it can be mounted only in an adaptor 10 of the type which comprises at a maximum eight active conductive areas 28 corresponding to the contact strips on the mini-card 12.

Naturally the electrical connection between the conductive areas 28 and the contact strips 14 is necessary only for the contact strips 14 which are active and which are necessary for the connector to allow the processing of the data stored in the mini-card 12.

Figure 3:
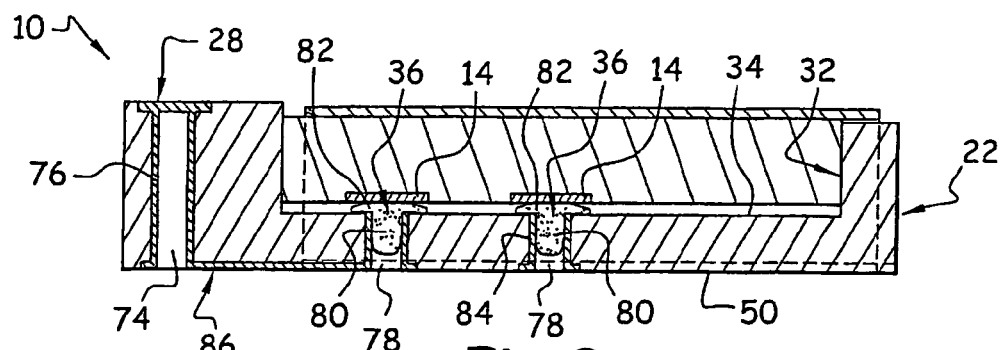
FIG. 3 is a view similar to that in FIG. 2 which depicts a second embodiment of the adaptor according to the invention.

FIG. 3 depicts a second embodiment of an adaptor 10 according to the teachings of the invention.

The adaptor 10 according to the second embodiment is distinguished from the first through the embodiment of the conductive areas 28 and the connecting pads 36, as well as through the embodiment of the electrical connection between the areas 28 and the pads 36. This is because the conductive areas 28 and the connecting pads 36, as well as the electrical connections between the areas and the pads, are implemented using a known technology for the production of printed circuits.

Thus the conductive areas 28 are produced, on the top main face 26 of the body 22, by deposition and etching of a layer of conductive material, for example based on copper.

Each conductive area 28 is arranged in line with a vertical connecting well 74 or conductive via, which extends between the top main face 26 and the bottom main face 50 of the body 22.

The wall of each connecting well 74 is coated with a layer 76 of conductive material, for example the same material as that which is used for producing the conductive areas 28, so as to electrically connect each conductive area 28 with the bottom main face 50 of the body 22.

Each connecting pad 36 is arranged in line with a vertical connecting well 78 which extends between the connecting wall 34 of the housing 32 and the bottom main face 50 of the body 22.

A film 80 of conductive elastic material or conductive adhesive, for example silicon containing metallic particles, is deposited in each connecting well 78. The conductive adhesive forms a "heap" in each connecting well 28 and "overflows" on the connecting wall 34 side so as to form a protrusion 28, protruding inside the housing 32, which constitutes a connecting pad 36.

The wall of each connecting well 78 associated with a connecting pad 36 is here coated with a layer 84 of conductive material, for example the same material as that which is used for producing the conductive areas 28.

As the conductive adhesive 80 forming each connecting pad 36 is in contact with the layer 84 of conductive material lining the wall of the associated connecting well 78, each connecting well 78 electrically connects the associated pad 36 with the bottom main face 50 of the body 22.

The bottom main face 50 of the body 22 comprises a series of conductive strips 86 which are connected for example in the same way as the conductive areas 28, by deposition and etching of a layer of conductive material based on copper.

These conductive tracks 86 are arranged on the bottom main face 50 of the body 22 so as to electrically connect the bottom end of each connecting well 74, associated with a conductive area 28, to the bottom end of each connecting well 78, associated with a corresponding connecting pad 36.

The conductive tracks 86 and the connecting wells 74, 78 therefore electrically connect each conductive area 28 to the corresponding connecting pad 36.

The elasticity of the conductive adhesive 80 forming each connecting pad 36 guarantees the electrical connection by contact between each connecting pad 36 and the associated contact strip 14 of the mini-card 12, here despite any lack of co-evenness between the connecting face 34 of the housing 32 and the opposite face 18 of the mini-card 12. This is because, when the mini-card 12 is placed in the housing 32, the contact strips 14 come into abutment vertically against the associated connecting pads 36, causing a slight crushing of these pads 36, by elastic deformation, which compensates for the defects in co-evenness.

The functioning of the adaptor 10 according to the second embodiment is similar to the functioning of the adaptor 10 according to the first embodiment.

FIGS. 4 to 7 depict several intermediate steps of an example of a method for manufacturing the adaptor 10 according to the second embodiment.

Figure 4:
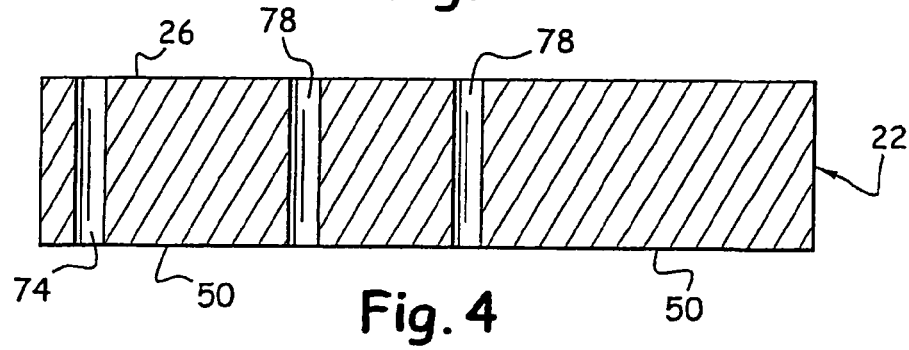
FIGS. 4 to 7 are views similar to that in FIG. 2 which illustrate several steps of the method of manufacturing the adaptor of FIG. 3.

During a first step, which is illustrated by FIG. 4, the body 22 is produced from insulating material, for example by plastic moulding.

The connecting wells 74, 78 can be produced during this first step, for example by drilling.

Figure 5:
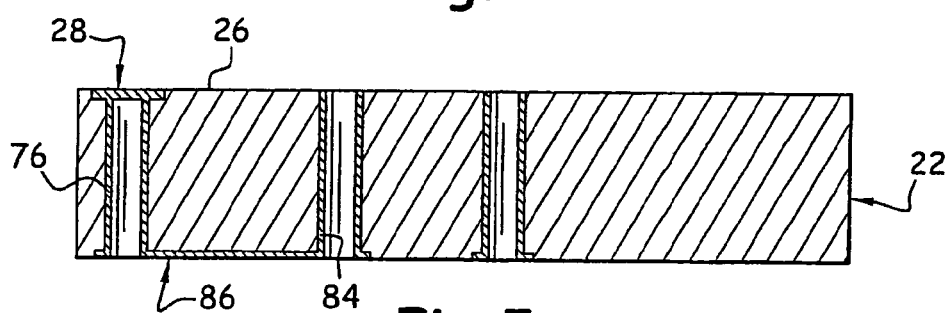

During a second step, which is illustrated by FIG. 5, a layer of conductive material, for example copper, is deposited on the top 26 and bottom 50 faces of the body 22, as well as on the walls of the connecting wells, 74, 78.

This layer of conductive material is etched so as to form the conductive areas 28 on the top face 26 of the body 22 and a series of conductive tracks 86 on the bottom face 50 of the body 22.

Figure 6:
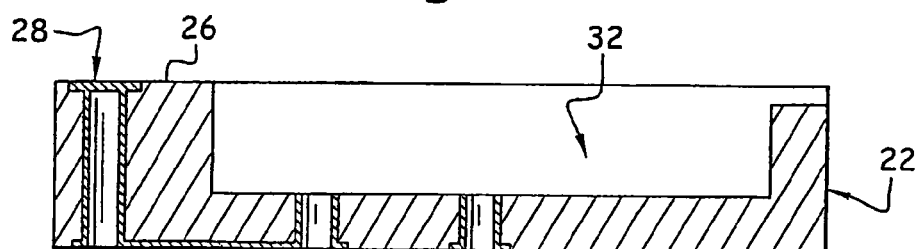

During a third step, which is illustrated by FIG. 6, the housing 32 is machined in the top face 26 of the body 22.

Figure 7:
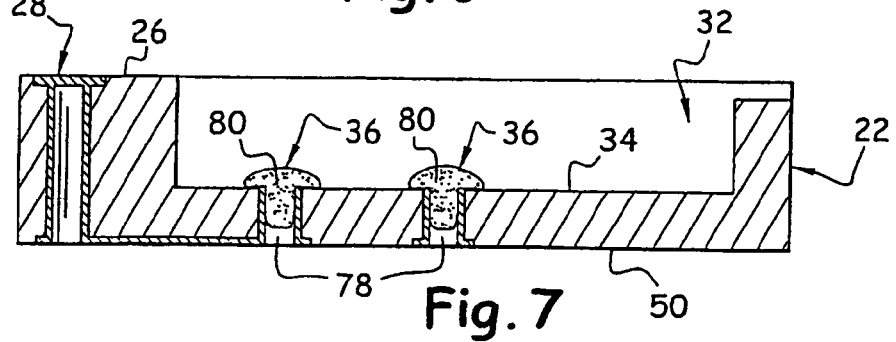

During a third step, which is illustrated by FIG. 7, the connecting pads 36 are formed by the deposition of a "heap" of conductive adhesive 80 in the connecting well 78 associated with the connecting wall 34.

The adaptor 10, which is depicted in FIG. 3, is then obtained.

Figure 8:
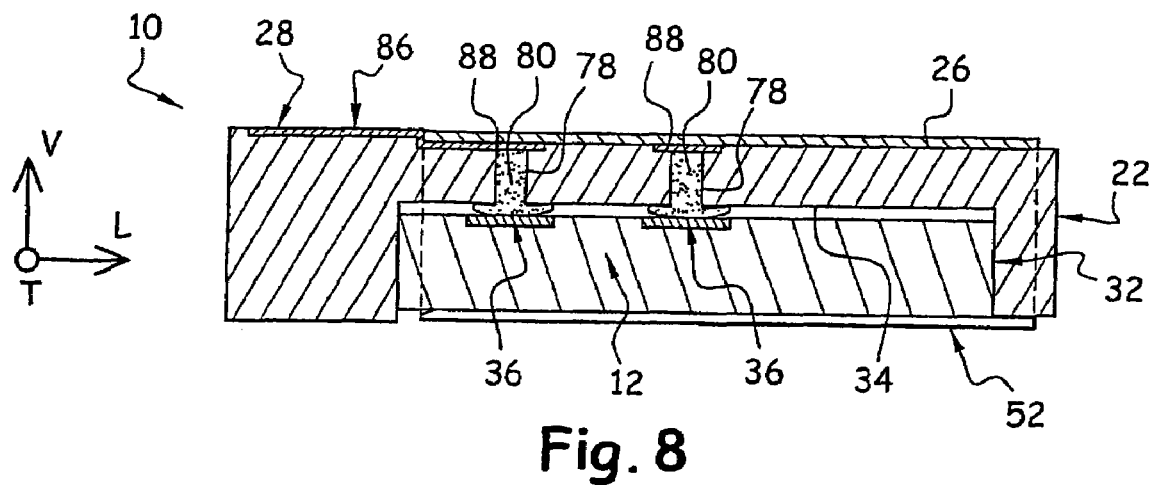
FIG. 8 is a view similar to that in FIG. 2 which depicts a third embodiment of the adaptor according to the invention.

According to a third embodiment of the invention, which is depicted in FIG. 8 and which is similar to the second embodiment, the conductive tracks 86 are arranged on the top main face 26 of the body 22, and the housing 32 emerges in the bottom main face 50 of the body 22.

In this embodiment, only the connecting pads 36 comprise associated connecting wells 78.

The top opening of each connecting well 78 is here blocked by the end portion 88 of a conductive strip 86, so as to facilitate the filling of the connecting well 78 with the conductive adhesive 80 forming a connecting pad 36 in the housing 32.

The internal walls of the connecting well 78 are not coated with conductive material, so that each connecting pad 36 is electrically connected with the associated conductive track 86 by contact between the conductive adhesive 80 and the end portion 88 of the track 86 which blocks the top opening of the well 78.

According to a fourth embodiment of the invention, which is depicted in FIG. 8 and which is similar to the second embodiment, the connecting pads 36 are metallic domes 90 arranged in complementary cavities 92 produced in the connecting face 34 of the housing 32.

The conductive tracks 86, which electrically connect the metallic domes 90 with the corresponding conductive areas 28, are here arranged on several layers, here two layers.

The body 22 of the adaptor 10 is therefore produced in the form of two layers of plastic 94, 96 superimposed vertically, in accordance with the technology used for producing chip cards with a support of the "laminated" type.

Figure 9:
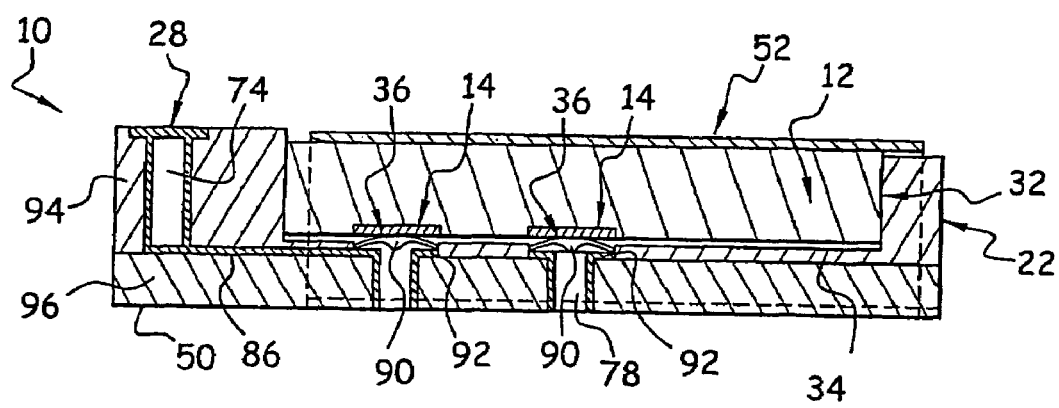
FIG. 9 is a view similar to that in FIG. 2 which depicts a fourth embodiment of the adaptor according to the invention.

A first part of the connecting pads 36 is connected to the corresponding conductive areas 28 by a first series Si of conductive tracks 86 which are arranged between the two layers of plastic 94, 96, in accordance with the example depicted in FIG. 9.

It will be noted that, for this first series Si of conductive tracks 86, the connecting wells 74 associated with the conductive areas 28 do not need to pass through the bottom layer 96 of the body 22.

The conductive tracks 86 of this first series Si extend here into the bottom of each cavity 92 associated with a metallic dome 90.

A second part of the connecting pads 36 is connected to the corresponding conductive areas 28 by a second series S2 of conductive tracks 86 which are arranged on the bottom main face 50 of the body 22, in accordance with the second embodiment depicted in FIG. 3. This second series S2 of conductive tracks 86 is not depicted in FIG. 9.

For this second series S2 of conductive tracks 86, the connecting wells 74 associated with the conductive area 28 must pass through the two layers 94, 96 of the body 22, and each metallic dome 90 comprises a connecting well 78 which extends vertically between the associated cavity 92 and the bottom main face 50 of the body 22.

The invention claimed is:

1. An adaptor for the electrical connection of a mini-card having surface contacts to an external connector for an electronic memory card, said adaptor comprising a body having a main face on which are disposed conductive areas for contacting corresponding conductors of the external connector, said body comprising:
    a cavity for receiving a mini-card,
    a wall having one side that defines an interior surface of said cavity and an opposite side that defines an exterior surface of said body,
    connecting pads that protrude beyond said interior surface into said cavity to engage the contacts of a mini-card inserted in said cavity, and
    conductive tracks disposed within said wall, that directly extend in a one-to-one relationship from respective ones of said connecting pads to corresponding ones of said conductive areas on said main face to electrically connect the connecting pads to their corresponding conductive areas.

2. An adaptor according to claim 1, wherein each connecting pad comprises a film of conductive elastic material which forms a protrusion inside said cavity, so as to ensure electrical connection by contact between each connecting pad and the associated surface contact on the mini-card.

3. An adaptor according to claim 1, wherein each connecting pad is formed by a metallic dome attached to said wall.

4. An adaptor according to claim 1, wherein the mini-card is a mini-SIM card.

5. An adaptor according to claim 1, wherein said body has the form of a MultiMedia Card.

6. An adaptor according to claim 1, wherein the conductive tracks comprise at least one first conductive track and at least one second conductive track longer than the at least one first conductive track, the at least one first and at least one second conductive tracks extending in a substantially common direction toward the conductive areas.

7. An adaptor according to claim 1, wherein the body is produced from a plastic material which is molded around conductive blades, each blade comprising a first end section forming one of said conductive areas, a second end section forming a corresponding connecting pad, and an intermediate section forming a conductive track.

8. An adaptor according to claim 7, wherein a second end section of each blade extends generally longitudinally, forming a protrusion projecting inside the cavity so that, when a mini-card is present in the cavity, each connecting pad is forced elastically towards an associated surface contact of the mini-card in order to contact one another.

9. An adaptor according to claim 1, further comprising a cover which at least partially closes off said cavity and maintains the mini card in electrical contact with said connecting pads.

10. An adaptor according to claim 9, wherein the cover slides longitudinally on the body to close off said cavity.

11. An adaptor according to claim 10, wherein the cover is U-shaped comprising a transverse main plate and two longitudinal lateral wings, and wherein each lateral wing is provided with a flange which engages a portion of said external surface of the body.

12. An adaptor for the electrical connection of a mini-card having surface contacts to an external connector for an electronic memory card, said adaptor comprising a body having a main face on which are disposed conductive areas for contacting corresponding conductors of the external connector, said body comprising:
    a cavity for receiving a mini-card;
    a wall disposed in the dimension between an interior surface of said cavity and an exterior surface of said body;
    connecting pads that protrude beyond said interior surface into said cavity to engage the contacts of a mini-card inserted in said cavity, and
    conductive tracks disposed within said dimension, that directly extend in a one-to-one relationship from respective ones of said connecting pads to corresponding ones of said conductive areas on said main face to electrically connect the connecting pads to their corresponding conductive areas.

13. The adaptor of claim 12, wherein said conductive tracks are disposed at least partially within a space in said wall between said interior surface of the cavity and said exterior surface of the body.

14. An adaptor according to claim 12, further comprising a cover which at least partially closes off said cavity and maintains the mini card in electrical contact with said connecting pads.

15. An adaptor according to claim 12, wherein the conductive tracks comprise at least one first conductive track and at least one second conductive track longer than the at least one first conductive track, the at least one first and at least one second conductive tracks extending in a substantially common direction toward the conductive areas.

16. An adaptor for the electrical connection of a mini-card having surface contacts to an external connector for an electronic memory card, said adaptor comprising a body having a main face on which are disposed conductive areas for contacting corresponding conductors of the external connector, said body comprising:
    a cavity for receiving a mini-card;
    a wall disposed between an interior surface of said cavity and an exterior surface of said body;
    connecting pads that protrude beyond said interior surface into said cavity to engage the contacts of a mini-card inserted in said cavity, and
    conductive tracks disposed on one of said surfaces of said wall, that directly extend in a one-to-one relationship from respective ones of said connecting pads to corresponding ones of said conductive areas on said main face to electrically connect the connecting pads to their corresponding conductive area.

17. An adaptor according to claim 16, further comprising a cover which at least partially closes off said cavity and maintains the mini card in electrical contact with said connecting pads.

18. An adaptor according to claim 16, wherein the conductive tracks comprise at least one first conductive track and at least one second conductive track longer than the at least one first conductive track, the at least one first and at least one second conductive tracks extending in a substantially common direction toward the conductive areas.

19. The adaptor of claim 16, wherein the conductive tracks are disposed on the surface of said wall that is opposite from said cavity.

20. An adaptor according to claim 19, wherein each connecting pad is arranged in line with a vertical conductive via which extends between said interior surface of said cavity and said opposite surface of the wall, and contains a conductive material, so that each conductive via electrically connects a connecting pad to an associated conductive track on said opposite surface of the wall.

21. An adaptor for the electrical connection of a mini-card having surface contacts to an external connector for an electronic memory card, said adaptor comprising a body on which are disposed conductive areas for contacting corresponding conductors of the external connector, said body comprising:

a cavity for receiving a mini-card;

a wall having one side that defines an interior surface of said cavity and an opposite side that defines an exterior surface of said body; and connecting pads that protrude beyond said interior surface into said cavity to engage the contacts of a mini-card inserted in said cavity;

wherein the wall is devoid of electronic components.

22. An adaptor according claim 21, wherein the connecting pads comprise an elastic conductive material so as to have good contact with the contacts of the mini-card.

23. An adaptor according claim 21, wherein the adaptor further includes conductive tracks disposed between superimposed layers of the wall, the conductive tracks connecting the conductive areas to the connection pads.

24. An adaptor according to claim 23, wherein the conductive tracks comprise at least one first conductive track and at least one second conductive track longer than the at least one first conductive track, the at least one first and at least one second conductive tracks extending in a substantially common direction toward the conductive areas.

* * * * *